(No Model.) 5 Sheets—Sheet 4.

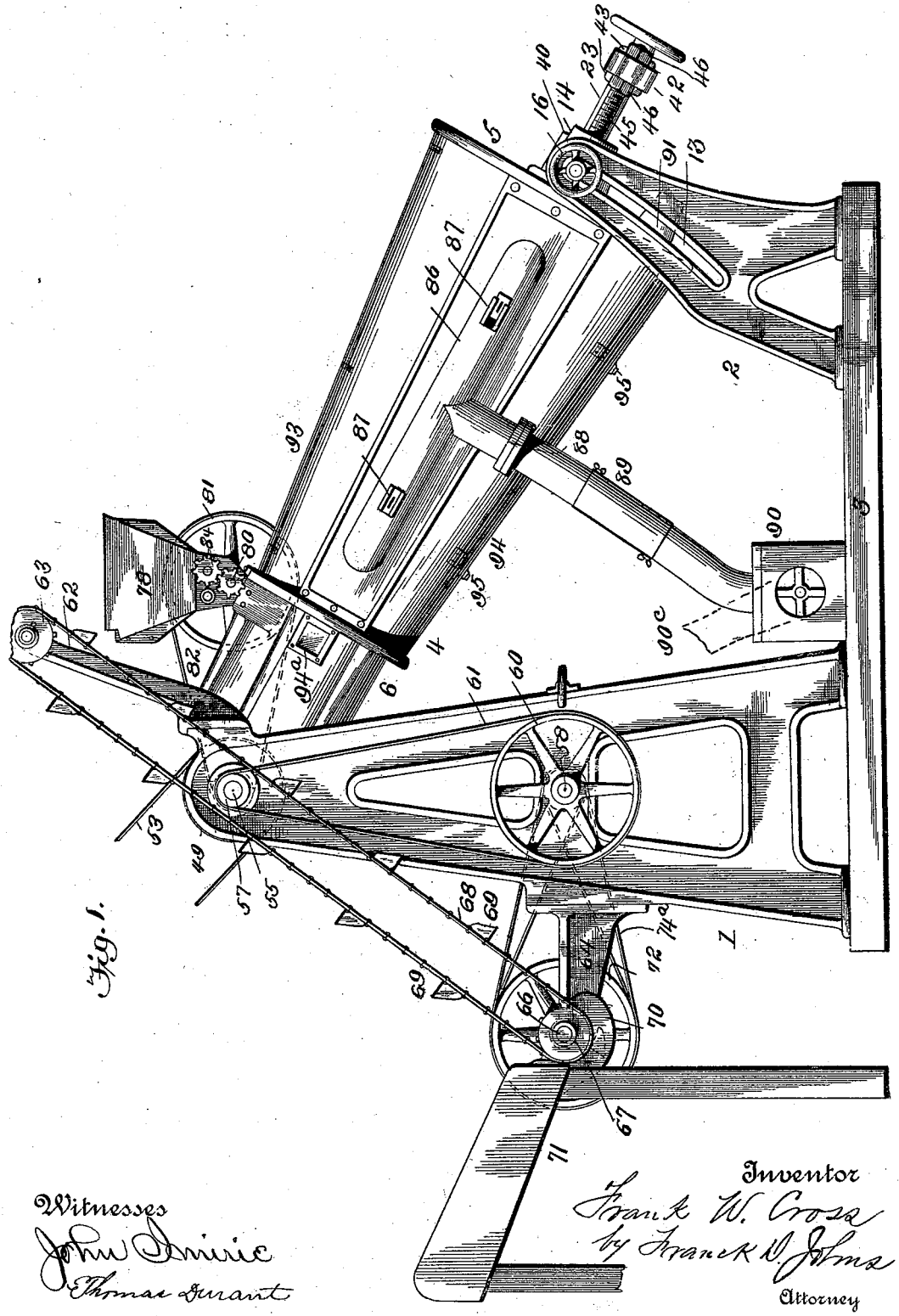

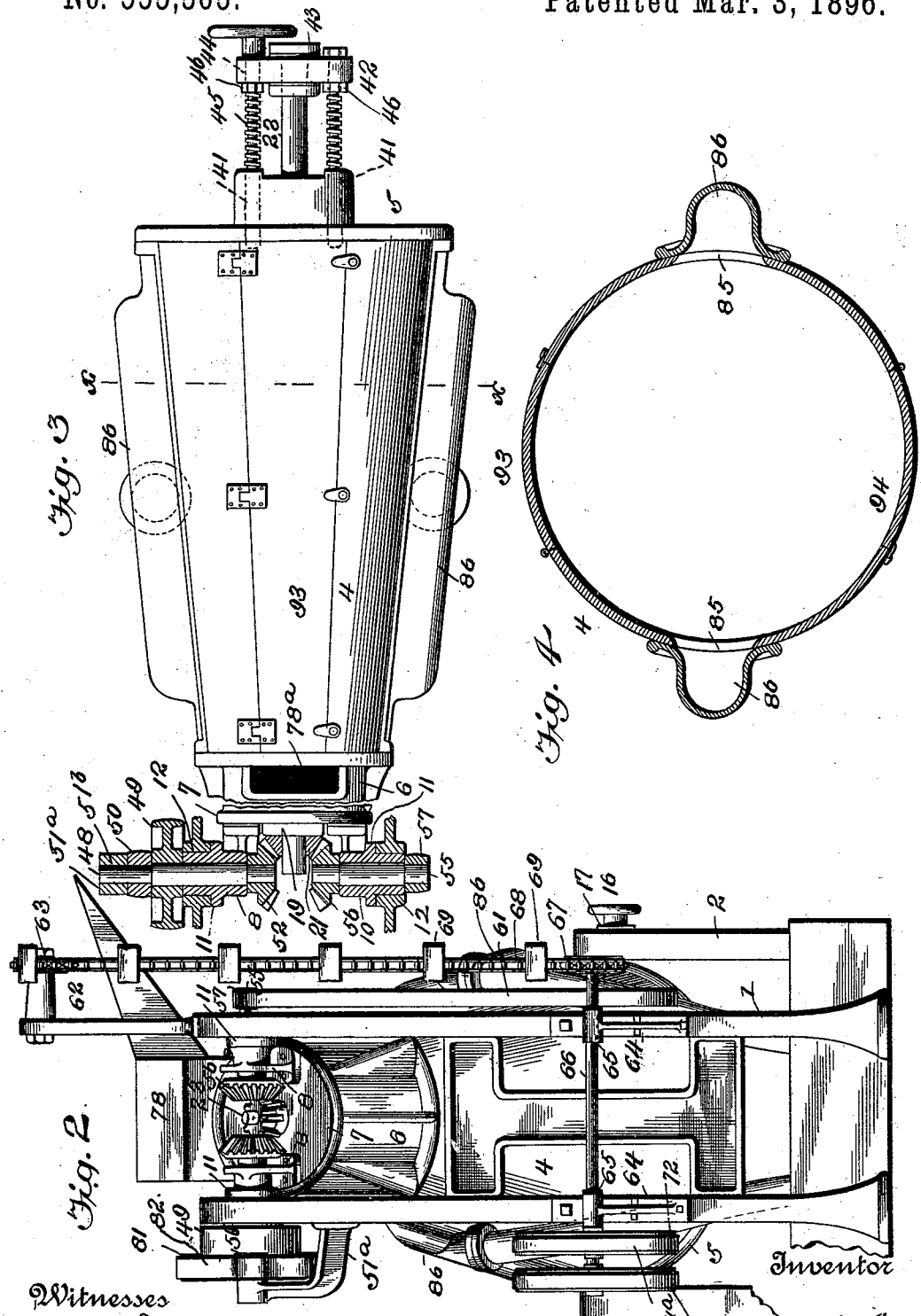

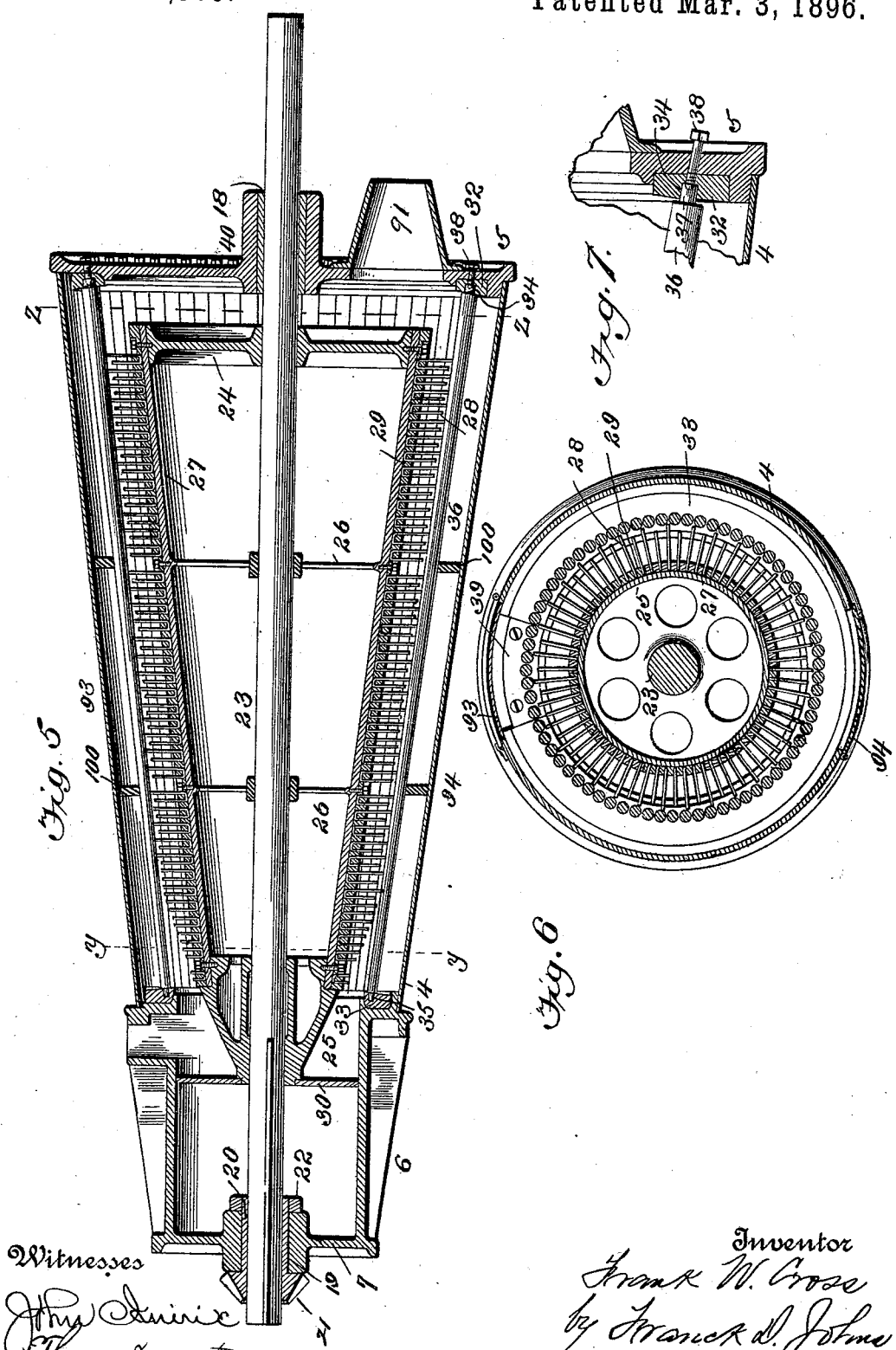

F. W. CROSS.
MACHINE FOR DELINTING COTTON SEED.

No. 555,565. Patented Mar. 3, 1896.

Witnesses
Inventor
Frank W. Cross
by Franck D. Johns
Attorney (No Model.)  5 Sheets—Sheet 5.

F. W. CROSS.
MACHINE FOR DELINTING COTTON SEED.

No. 555,565.  Patented Mar. 3, 1896.

Witnesses

Inventor
Frank W. Cross
by Franck D. Johns
Attorney

UNITED STATES PATENT OFFICE.

FRANK W. CROSS, OF WASHINGTON, DISTRICT OF COLUMBIA, ASSIGNOR TO THE CROSS MANUFACTURING COMPANY, OF VIRGINIA.

MACHINE FOR DELINTING COTTON-SEED.

SPECIFICATION forming part of Letters Patent No. 555,565, dated March 3, 1896.

Application filed September 4, 1894. Serial No. 522,090. (No model.)

*To all whom it may concern:*

Be it known that I, FRANK W. CROSS, a citizen of the United States, residing at Washington, in the District of Columbia, have invented certain new and useful Improvements in Machines for Delinting Cotton-Seed; and I do hereby declare the following to be a full, clear, and exact description of the invention, such as will enable others skilled in the art to which it appertains to make and use the same.

My invention relates to improvements in machines for delinting cotton-seed, and is more particularly an improvement upon Patent No. 499,873, granted to me June 20, 1893.

My said invention consists in certain novelty in the construction, arrangement, and combination of the various parts of the same, all of which I will now proceed to point out and describe, reference being had to the accompanying drawings, in which—

Figure 9:
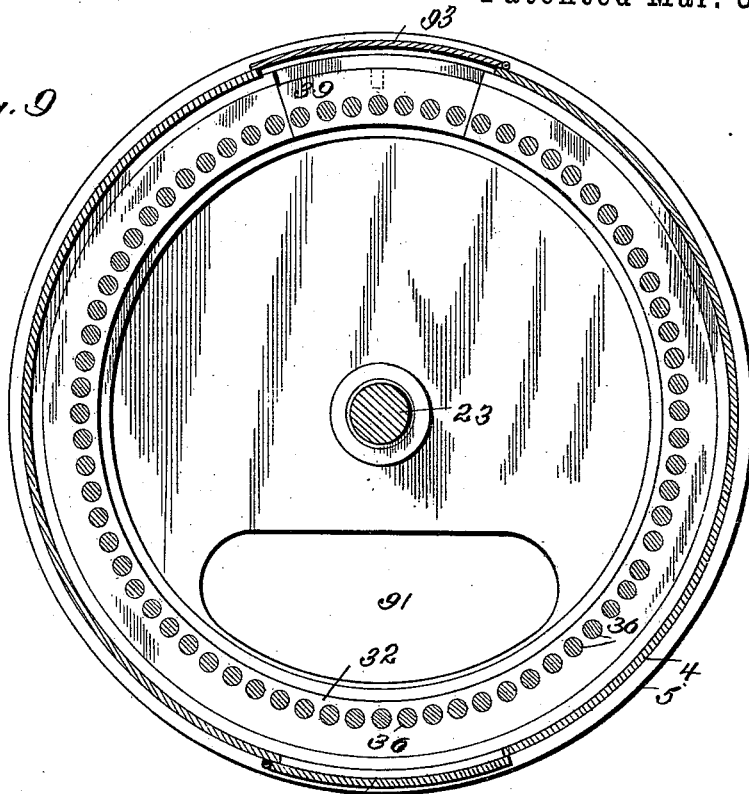
Figure 8:
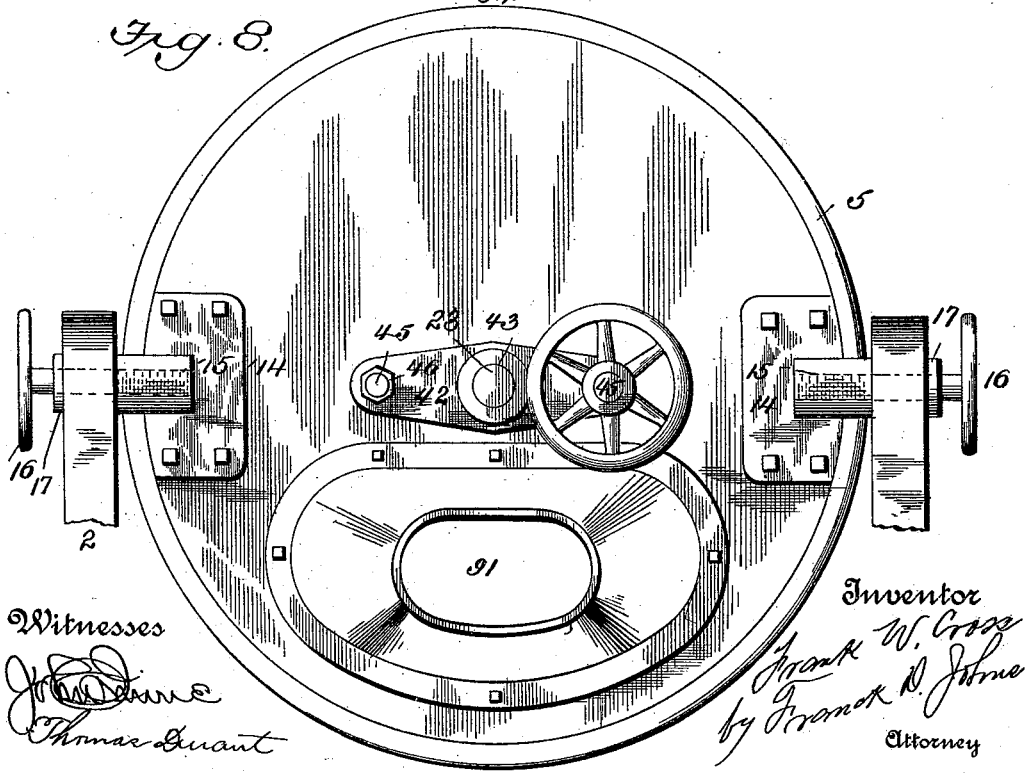
Figure 10:
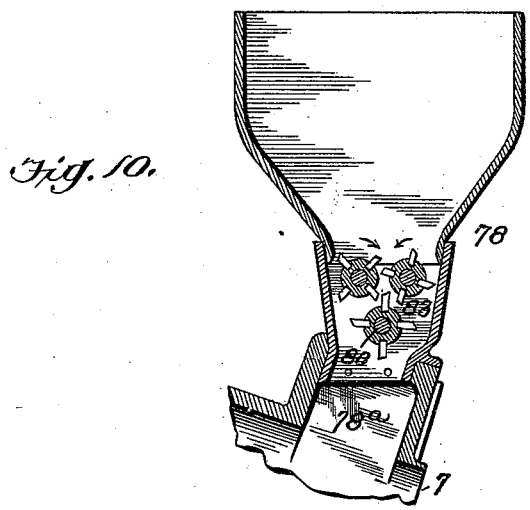
Figure 11:
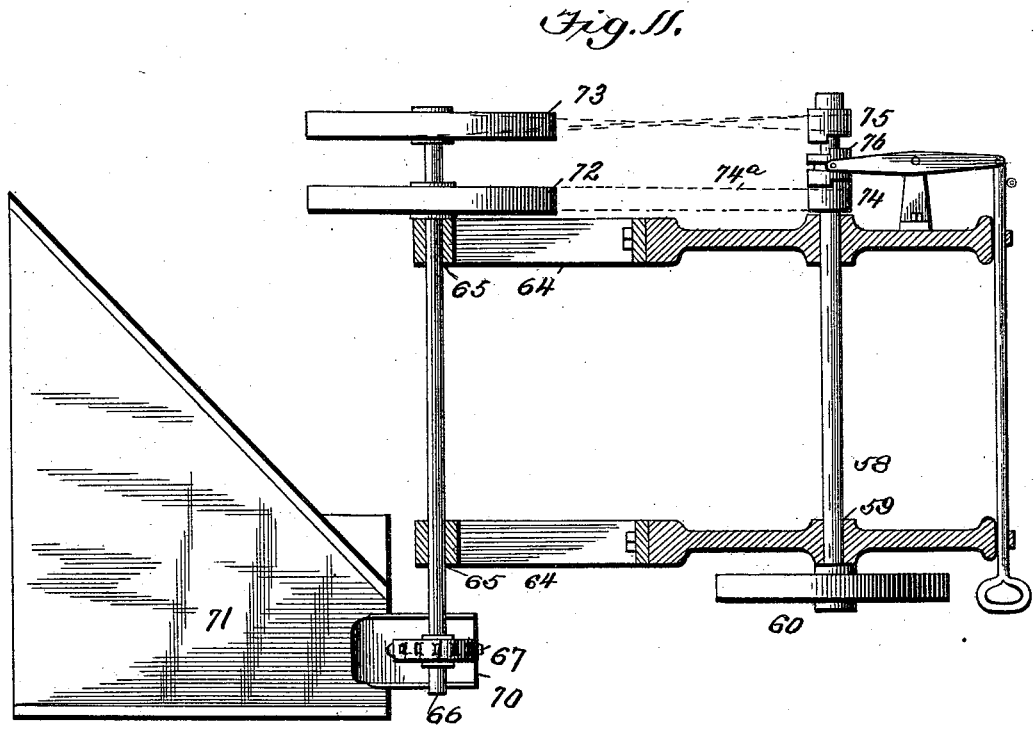

Figure 1 is a side elevation of a machine embodying my invention. Fig. 2 is a rear end elevation; Fig. 3, a top plan view of the casing of the machine, the feeding-hopper being removed and a portion of the driving mechanism being shown in section. Fig. 4 is a cross-section of the casing, taken on line $xx$ of Fig. 3. Fig. 5 is a longitudinal section of the casing and brush, the brush-shaft and rollers being shown in section. Fig. 6 is a cross-section taken on line $yy$ of Fig. 5; Fig. 7, an enlarged detail of the adjusting-screws for the rollers. Fig. 8 is an elevation of the lower end of the casing. Fig. 9 is a cross-section taken on line $zz$ of Fig. 5. Fig. 10 is a detail in section of the feeding-hopper and stirrers. Fig. 11 is a plan view of the clutch mechanism for controlling the endless feeding-belt.

Referring to said drawings, the frame of the machine consists of two rear uprights or supports, 1, and two shorter forward uprights or supports, 2, secured to a suitable base 3, or, if preferred, directly secured to the flooring.

4 is a cone-shaped casing or housing having a lower head 5 on its larger end and a substantially cylindrical casting 6 secured to its upper end, said casting having a head 7. To the head 7, at diametrically-opposite points, are secured brackets 8, on which are formed trunnion-bearings 10, provided with annular flanges 11. Said trunnion-bearings are, respectively, mounted in bearings 12, formed in the rear uprights or supports. By means of this construction the casing or housing may be swung upon the supports and adjusted at any desired angle, for a purpose hereinafter described. The forward uprights, 2, are provided with segmental slots 13.

14 are castings secured to diametrically-opposite points on the lower head of the casing. Said castings are provided with screw-threaded apertures 15.

16 are clamping hand-screws passing through the segmental slots 13 and engaging the female screws in the castings 14. Said screws are provided with collars 17. When the casing is adjusted at the desired angle, the screws are tightened until the collars 17 engage the outer side of the uprights, and the said casing is thus held in position.

An ordinary headed screw may be used instead of the hand-screws, or any other desired means may be employed to hold the casing as adjusted.

In the center of the lower head of the casing is formed a bearing 18, and in the center of the head 7 of the cylindrical casting is formed a bearing 19, in which latter is mounted the hollow shank 20 of a bevel-gear 21, which gear is held in place by a suitable collar or nut 22.

23 is a brush-shaft having its lower end mounted in the bearing 18 and its upper end passing through and extending beyond the hollow shank 20 and pinion 21, which form its upper bearing. The pinion is splined to the shaft, as shown, and thus permits said shaft to be moved longitudinally. To the lower part of the brush-shaft is rigidly secured a spider 24, to its upper part a conical head 25, and at suitable intervals brace-arms or spiders 26. To these are secured a conical brush-support 27, preferably made of metal.

28 is the brush made of wire or other suitable material secured to a suitable backing 29, said backing being made in longitudinal sections, whereby the same may be readily adjusted and removed. This brush is rigidly secured to the brush-support. The bristles at the upper ends of the brush are cut away in an inclined line, as shown.

30 is a circular guard secured to the conical head 25 and fitting snugly against the inside of the cylindrical head, thus preventing any possibility of leakage of oil or the backing up of seed in the head. Said guard moves freely in the head.

32 is an annular bearing-block secured to the lower head of the casing, and 33 an annular bearing-block secured to the upper head.

34 are independent bearings formed in and extending partly through the lower bearing-block, and 35 are bearings formed in the upper bearing-block registering with the bearings 34. In said bearings are mounted a series of independent tapering rods or rolls 36 having journals 37, the small ends of the rods or rolls being at the top. Said rolls are so arranged that a space is left between each of sufficient size to permit lint to pass, but not to permit the passage of a seed. Each roll or rod is free to have an independent movement, and the entire set of rolls or rods is concentric with the casing, thus forming a conical backing or surface, against which the seeds are forced as the brush is revolved.

38 are a series of set-screws in the lower head, which engage the lower ends of the rolls and regulate the degree of speed with which they turn.

The bearing-blocks are formed with a removable section 39 on top, so that the same can be taken out and the brush cleaned or a section removed for repairs or other purposes.

On the outside of the lower head of the casing is an enlarged portion 40 cast integral with said head and through which the brush-shaft passes.

41 are female screws on diametrically-opposite sides of the brush-shaft bearing in said casing and extending through said lower head.

42 is a cross-bar loosely mounted on the lower end of the brush-shaft between two collars 43 rigidly secured to said shaft. In each end of said cross-bar are formed smooth bearings 44 for adjusting-screws 45, one of which is provided with a hand-wheel, the other screw being provided with a head and adapted to be operated by a wrench or other means. Said screws engage with the female screws in the enlarged portion 40. Each screw is provided with binding-nuts 46. Upon releasing the binding-nuts by means of the adjusting-screws the shaft may be moved up or down to regulate the space between said brush and the surrounding backing-surface of rolls or rods.

Mounted in one of the trunnion-bearings is a short shaft 48, on the outer end of which is mounted a fixed pulley 49 and a smaller fixed pulley 50.

51$^a$ is a bracket-arm secured to one of the uprights 1, in the upper end of which is a bearing 51$^b$, in which the outer end of the shaft 48 is mounted. On the inner end of said shaft is a fixed beveled gear 52 engaging the beveled gear secured to the upper end of the brush-shaft.

53 is a belt on the pulley 49, connected with any suitable means of power. Through this mechanism motion is imparted to the brush-shaft and brush to revolve the same. Suitable means may be employed to reverse the direction of motion of the belt and thus reverse the movement of the brush-shaft and brush. In the other trunnion-bearing is mounted a short shaft 55, on the inner end of which is mounted a fixed beveled gear 56, also engaging the beveled gear on the end of the brush-shaft. On the outer end of this shaft is mounted a fixed pulley 57.

58 is a counter-shaft mounted in bearings 59 on the rear uprights. Upon one end of this shaft is mounted a fixed pulley 60, having belt connection 61 with the pulley 57, and through which the shaft 58 is operated.

62 is an upright arm secured to one of the rear supports and having mounted on its upper end a sprocket-wheel 63.

64 are brackets secured to the rear of the uprights 1, having bearings 65 in their ends, in which is mounted a second counter-shaft 66.

67 is a sprocket-wheel mounted on one end of the shaft 66 and connected by a sprocket-chain 68 with the sprocket-wheel 63. Said chain is provided with buckets 69, which form an endless carrier to convey the seed to the feeding-hopper hereinafter described. Said buckets enter a seed-receptacle 70, which is fed by a chute 71.

On the opposite end of the second counter-shaft 66 are rigidly mounted pulleys 72 and 73. On the corresponding end of the shaft 58 are loosely mounted small pulleys 74 and 75, the pulley 74 having straight-belt connection 74$^a$ with the pulley 72, and the pulley 75 having cross-belt connection with the pulley 73.

76 is a double clutch splined upon the shaft 58 and operated by lever mechanism, whereby either of the pulleys 72 or 73 may be thrown into operation, the object of this mechanism being to keep the endless feeder moving in the same direction, no matter what the movement of the brush-shaft may be.

78 is a feed-hopper located just above the upper small end of the conical casing into which the seeds are dropped by the endless carrier.

78$^a$ is an aperture in the cylindrical casting or head through which the seeds fall and are conveyed by gravity between the brush and surrounding backing or surface of rods or rolls.

80 is a shaft mounted in bearings in said hopper, carrying on one end a pulley 81, having belt connection 82 with the pulley 50, by means of which the stirrers 83 are operated through suitable gearing 84. On each side of the conical casing are openings 85 communicating with the exhaust-chambers 86, said chambers having valves 87, and each of said chambers being connected with exhaust-pipes 88, preferably having a telescopic joint 89. Said pipes in turn communicate with an exhaust-fan 90, which directs the lint through a pipe 90° to any suitable receptacle or lint-room. In the lower head of the bottom of the casing are a discharge opening and chute 91, through which the cleaned seed is discharged.

93 and 94 are hinged doors on the top and bottom of the casing, by means of which the interior may at any time be inspected and cleaned.

94ᵃ is a sight-hole in the casing just below the feeding-hopper.

95 are vents in the bottom of the casing.

100 are braces on the inside of the casing, which engage the rolls or rods and prevent any sagging.

The operation of my machine is substantially the same as that described in my former patent. The casing is first set at the required angle, and the brush adjusted so as to bring it the necessary distance from the surrounding rolls. When power is applied, the seeds are fed in through the feed-hopper by the mechanism described, passing between the brush and rolls or rods in a spiral course, the brush removing the lint and the smooth surface-backing or surface of revoluble rolls preventing the hulls of the seeds from becoming broken or injured. The exhaust mechanism draws the lint between the rolls and conveys it to the blower, from whence it passes to any suitable receptacle or lint-room, the cleaned seed passing out through the discharge-opening.

A great advantage of the cone-shaped brush and surrounding cone-shaped surface of rolls having the larger end of the cone at the bottom is that the seeds are much more quickly fed and distributed, thus expediting their cleaning and preventing any clogging.

Having thus fully described my invention, what I claim as new is—

1. In a machine for delinting cotton-seed, the combination with a casing, a conical revoluble brush mounted in said casing, and means for revolving the same, of a series of tapering rods or rolls surrounding the brush, and arranged conically to leave the same space between each two adjacent rods or rolls throughout their length, and suitable exhaust mechanism communicating with the interior of the casing, substantially as shown and described for the purpose set forth.

2. In a machine for delinting cotton-seed, the combination with a revoluble conical brush and means for revolving the brush, of a surrounding backing or surface consisting of a series of conically-arranged smooth-surfaced tapering rolls or rods having a space between each two adjacent rolls or rods, said space being the same width between each roll or rod throughout their length, substantially as shown and described.

3. In a machine for delinting cotton-seed, the combination with a conical casing, 4, having trunnion-bearings, 10, on its smaller end, mounted in bearings in the uprights or supports, 1, clamping-screws, 16, secured to the lower and larger end of the casing, and engaging segmental slots in lower uprights or supports, 2, of a conically-arranged revoluble brush in said casing, and a surrounding backing or surface consisting of a series of conically-arranged tapering rods or rolls surrounding said brush and having a space between each two adjacent rolls or rods, substantially as shown and described.

4. In a machine for delinting cotton-seed, the combination with a cylindrical casing, 4, having a lower head, 5, and a cylindrical casting, 6, secured to its upper end and pivotally mounted in uprights, 1, and clamping-screws, 16, engaging a segmental slot, 13, in uprights, 2, exhaust-chambers, 86, said chambers provided with valves, 87, and a suitable exhaust mechanism communicating with the chambers, of a conical revoluble brush mounted in said casing, 4, and having a surrounding backing consisting of a series of revoluble rolls or rods surrounding said brush, and having a space between each two adjacent rolls or rods, substantially as shown and described.

In testimony whereof I affix my signature in presence of two witnesses.

FRANK W. CROSS.

Witnesses:
EMMA M. GILLETT,
H. KEABLES.